Jan. 6, 1931.  C. M. RICHLEY  1,787,454
AXLE
Filed Feb. 20, 1926

Inventor
Charles M. Richley
By Daniel F. Brennan.
Attorney.

Patented Jan. 6, 1931

1,787,454

UNITED STATES PATENT OFFICE

CHARLES M. RICHLEY, OF CHICAGO, ILLINOIS

AXLE

Application filed February 20, 1926. Serial No. 89,667.

This invention relates to axles and more particularly to an axle of the segmental type.

It contemplates more especially the provision of a straight axle or shaft comprising segments which are readily replaceable at little expense in the event that breakage should occur in any of the segments.

Numerous types of axles are in use, and due to the stresses exerted thereon, breaks usually occur adjacent the wheel support or bearing member which necessitate the replacement of the entire axle. This is objectionable in that replacements are expensive and require a great deal of time which renders the vehicle or other structure carried thereby useless while repairs are being made.

One object of the present invention is to simplify and improve the construction of devices of the character mentioned.

Another object is to provide an inexpensive segmental structure which is easily assembled and which facilitates replacement of segments with little difficulty.

Other objects and advantages will appear from the following description of an illustrated embodiment of the present invention.

Figure 1:
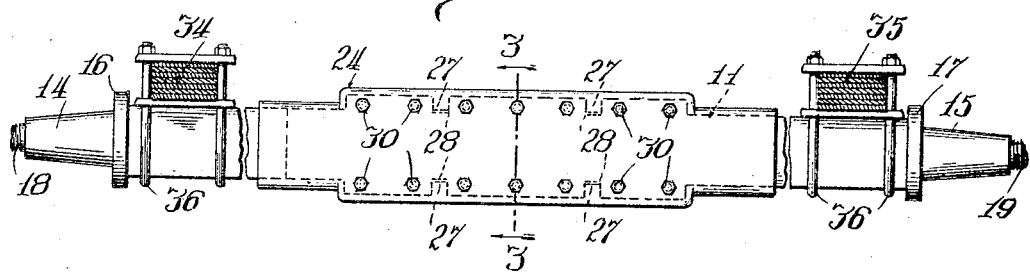
Figure 1 is a view in elevation of an axle embodying features of the present invention.
Figure 2:
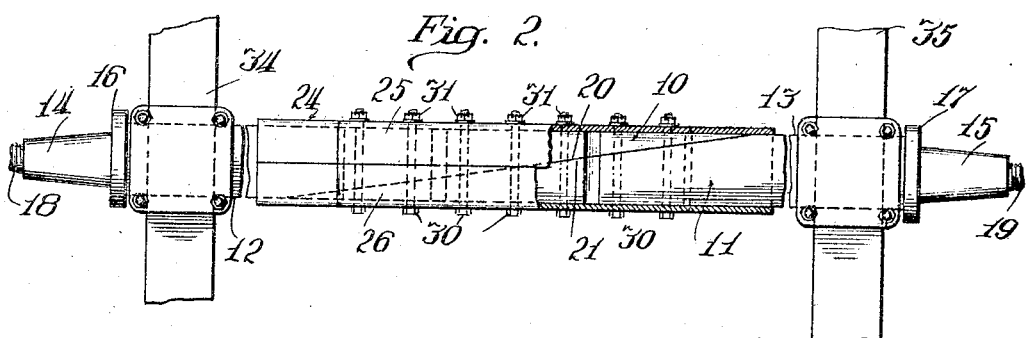
Figure 2 is a plan view of the axle shown in Figure 1.
Figure 3:
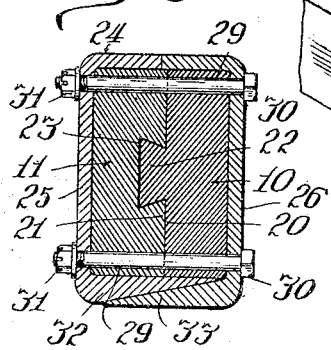
Figure 3 is a sectional view taken substantially along line 3—3 of Figure 1.
Figure 4:
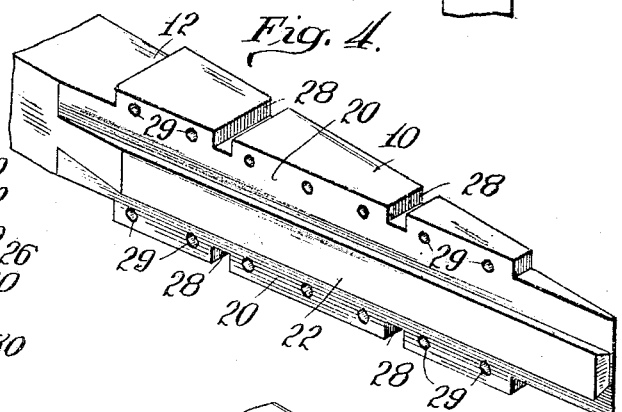
Figure 4 is a fragmentary perspective view showing a segment of the axle illustrated in Figure 2.
Figure 5:
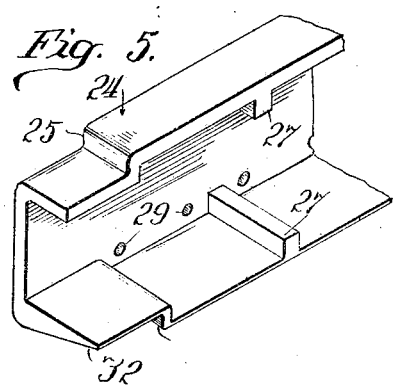
Figure 5 is a fragmental perspective view of a casing shown in section in Figure 3.
Figure 6:
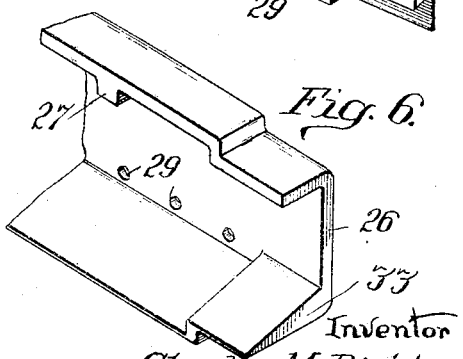
Figure 6 is a fragmental view of the complementary section of the casing shown in Figure 5.

The axle selected for illustration comprises two complementary elongated members 10 and 11 which, in this instance, are wedge-shaped and terminate at opposite ends in a reduced portion 12 and 13, respectively. Suitable bearings or supports 14 and 15 are integrally fixed to the extremities 12 and 13, respectively, of the segments constituting the axle or shaft. As shown, the bearings 14 and 15 are in alignment when the segments 10 and 11 are assembled, and secured to each other, thereby making possible the reception of wheels thereon, which support the axle comprising the interfitting members 10 and 11. Collars 16 and 17 are provided on the extremities of the members 10 and 11 adjacent the bearings to limit the inward movement of the wheels thereon, whereas the free ends of the bearings are provided with reduced threaded portions 18 and 19 to receive suitable means for limiting the outward movement of the wheels, thereby preventing axial movement of the wheels. It is to be noted that other forms of bearings may be employed so that the axle or shaft may be used to support a stationary as well as a moving structure.

In order to retain the members 10 and 11 in rigid relation, the contacting inclined faces 20 and 21 defining the wedge, are provided with a mortise or interfitting joint consisting of a trapezoidal tongue 22 and a correspondingly shaped groove 23 adapted to cooperate therewith, whereby the members 10 and 11 are secured to each other. As shown, the joint extends throughout the length of the inclined face of the wedge-shaped members 10 and 11 which are united thereby.

A reinforcing casing 24 constituting the sections 25 and 26, is adapted to embrace the members 10 and 11. To prevent longitudinal movement between the complementary segments 10 and 11, the casing 24 is provided with alternately arranged ribs 27 on the interior thereof to fit in transverse grooves 28 provided in the members 10 and 11 so that the latter are maintained in fixed longitudinal relation as well as reinforced to sustain heavy loads.

As an added reinforcement, the casing and the segments covered thereby are provided with a series of transverse aligned holes 29 extending therethrough to receive appropriate bolts 30 which rigidly secures the members and the casing together by virtue of the nuts 31 threaded thereon in the usual manner. The nuts 31 are preferably castellated to receive cotter pins in the usual manner, which insures against the loosening and the removal of the nuts due to the vibrating effect imparted to the shaft. It is to be noted that the casing 24 and the segments 10 and 11 are split in crossed planes so that the joints may not materially weaken the structure along any definite plane. The casing 24 tightly embraces the sections 10 and 11 when the nuts 31 are tightened, owing to the fact that one face of the casing 24 is provided with tapered, overlapping flanges 32 and 33 which exert a wedging action on the axle, thereby providing a segmental axle having the rigidity of an integral, unitary structure.

The shaft may be secured to the frame of a vehicle in any suitable manner preferably through springs 34 and 35 which are secured thereto, in this instance, by means of the usual U-shaped clamps 36 provided for that purpose.

Various changes may be made in the embodiment of the invention herein specifically described without departing from or sacrificing any of the advantages of the invention as defined in the appended claims.

I claim:

1. In a device of the character described, an axle comprising cooperating sections, interfitting means on the adjacent faces of said sections, a two part casing for embracing said sections, each part of said casing having an inclined longitudinal flange on one side, said flanges overlapping when the casing is assembled and means extending through said axle and said two part casing for securing them together.

2. A device of the character described comprising complementary separable axle members having inclined adjacent faces arranged vertically and extending substantially the full length of said axle, one of said faces being provided with a longitudinal dove-tail rib and the other face with a slot shaped to fit and receive said rib thereby permitting of longitudinal separation of said members but preventing lateral separation thereof; a sectional casing enclosing said members and each section having an oppositely disposed overlapping wedge-shaped longitudinal flange; binding bolts extending transversely through said sectional casing and said members for drawing the casing sections together to cause said overlapping flanges to cooperate to bind said axle members and transverse interior ribs on said casing, there being corresponding transverse grooves in said axle members to receive said ribs.

3. A device of the character described, comprising complementary separable axle members having adjacent faces; one of said faces being provided with a longitudinal dove-tail rib and the other face having a slot shaped to fit and receive said rib; a sectional casing enclosing said members having oppositely disposed overlapping wedge-shaped flanges, and means for effecting cooperation of said flanges to exert a binding wedging action on said axle members for securing them in place.

4. A device of the character described, comprising complementary separable axle members having inclined adjacent faces arranged vertically and extending substantially the full length of said axle, one of said faces being provided with a longitudinal dove-tail rib and the other face with a slot shaped to fit and receive said rib thereby permitting of longitudinal separation of said members for preventing lateral separation thereof; a sectional casing enclosing said members and having longitudinal overlapping wedge-shaped flanges, and binding bolts extending laterally through said sectional casing and said members to effect cooperation of said overlapping flanges to exert a binding wedging action on said axle members for securing them in place.

In testimony whereof I affix my signature at 10 South La Salle Street, Chicago, Ill.

CHARLES M. RICHLEY.